US012138221B1

(12) United States Patent
Horian

(10) Patent No.: US 12,138,221 B1
(45) Date of Patent: Nov. 12, 2024

(54) ACCESSIBLE PILL CONTAINER

(71) Applicant: Richard Horian, Riverview, FL (US)

(72) Inventor: Richard Horian, Riverview, FL (US)

( * ) Notice: Subject to any disclaimer, the term of this patent is extended or adjusted under 35 U.S.C. 154(b) by 0 days.

(21) Appl. No.: 18/792,194

(22) Filed: Aug. 1, 2024

(51) Int. Cl.
*A61J 7/02* (2006.01)
*A61J 1/03* (2023.01)

(52) U.S. Cl.
CPC .................................... *A61J 1/03* (2013.01)

(58) Field of Classification Search
CPC .... A61J 1/03; A61J 1/00; A61J 7/0076; A61J 7/0084; A61J 7/0069; A61J 7/02; A61J 7/03; A61J 7/0436; A61J 83/04; A61J 83/0409; B65D 83/04; B65D 83/0409; B65D 83/0481
USPC ............. 414/675; 221/12; 222/572; 206/539
See application file for complete search history.

(56) References Cited

U.S. PATENT DOCUMENTS 5,117,982 A * 6/1992 Shotthafer ................ B07C 7/02 141/331
9,095,497 B1 * 8/2015 Prince ........................ A61J 1/03
10,150,583 B2 * 12/2018 Sherman ................. G01F 19/00
2010/0155411 A1 * 6/2010 Solari .................... B65D 83/04 221/87

* cited by examiner

*Primary Examiner* — King M Chu
(74) *Attorney, Agent, or Firm* — Cole Carlson

(57) ABSTRACT

An accessible pill container comprising a plurality of closely positioned blades that are integrally formed and molded within a plastic container and forming a concave bowl-shaped platform at a proximal end to be able to hold at least one pill created by the close proximity and concave shape of the blades. Pills enter the bowl by tilting the pill container sideways or upside down so that all of the pill contents rush toward the top of the bottle. Enough space is left between the bowl-shaped platform top and the underside of the cap to allow one or two pills to enter the small open space and fall into the platform bowl capturing the pill or pills until the user tilts the bottle back to its upright vertical position, removes the cap and slides the pill off of the platform with thumb and forefinger to be placed inside the mouth.

10 Claims, 3 Drawing Sheets

ACCESSIBLE PILL CONTAINER

FIELD OF THE INVENTION

This invention relates to a pill container. Specifically, the described invention relates to a pill container incorporating free standing blades integrally molded to the container floor and side wall with an upper platform for retrieving a pill creating ease of access to individuals with poor dexterity.

DESCRIPTION OF BACKGROUND ART

For hundreds of years the packaging of medicinal pills has been in bottles. The only major advancement in the past century is the package construction being switched from glass to plastic bottles. There have been several problems that have remained constant in the packaging of pills in plastic bottles.

To retrieve a single pill from the bottle, many people tilt the bottle to their mouths as if drinking and try to separate a single pill with their mouth by manipulation using their lips or tongue. This process creates several extra problems. Too many pills may enter the mouth and they are either dangerously swallowed creating an overdose situation or contaminated with saliva and spit back into the bottle allowing bacteria to enter the bottle's remaining pill population.

Fingers have also been inserted inside the bottle trying to physically manipulate a single pill to exit by sliding it against the side of the bottle wall. The problem here is that contaminated or dirty fingers touch many pills in the bottle while trying to accomplish separating and retrieving just one or two pills.

The bottle has also been tilted to allow the pouring of a plurality of pills into the palm of the hand so that one may be picked out of the bunch for consumption. Again, there is the problem of contamination by the extra pills coming in contact with the sweat, chemicals, bacteria or dirt on the hand. But there is a larger problem here which is dropping pills out of the hand while pouring and having them fall to the floor to then be lost, picked up off the ground and still consumed dirty or worst of all; losing some pills so the dosage recommended by the physician is reduced changing the pill count prescription required to be taken by the patient.

Those skilled in the art will quickly realize that the 'platform' may consist of a single protruding perpendicular ledge being secured separately or molded to the bottle side wall. The perpendicular side wall platform is not required to rest on and be secured to the side wall of the bottle. A separately formed perpendicular platform may be mechanically attached to the side wall or 'clipped' to the side wall via a clasp attached overhanging the top of the bottle. The platform just has to be close enough to the bottle side wall to prevent the pill from falling through. However, this method of using a separate added on platform requires substantial difficulties in molding due to 'undercuts.' Or it may be a separate platform that is attached to the sidewall as an additional operation. These possibilities and many others obvious to those skilled in the art are possible but not practical as they require an additional operation and cost to attach and or secure. Molding the bladed platform integrally and simultaneously with the bottle is more efficient and cost saving.

Therefore, it is an object of this invention to provide an improvement which overcomes the aforementioned inadequacies of the prior art devices and provides an improvement which is a significant contribution to the advancement of the pill container art.

Another object of this invention is to create a platform that is molded as part of the bottle and shaped so that the platform is positioned in the same direct linear 'in and out' straight line direction molding process to eliminate the requirement of any extra slides or other mechanical aids.

Another object of this invention is to create a single-piece pill container that requires no further mechanical aids.

Another object of this invention is to provide a platform that allows for easy retrieval of pills for direct and immediate use.

Another object of this invention is to provide a pill container that allows for access to one or a plurality of pills at a time after deposition on a platform.

Another object of this invention is to prevent users from overdosing on medicine.

Another object of this invention is to prevent bacterial contamination of the pill container or its contents.

Another object of this invention is to simplify the pill retrieval process from the bottle to aid the millions that suffer from arthritis, mental infirmities physical impairments, or age-related limitations to make pill retrieval from plastic bottles a much simpler and more accurate procedure.

Another object is to prevent spilling pills on a counter or other surface in order to access the pills.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The long-standing but heretofore unfulfilled need for an apparatus that overcomes the limitations of the prior art is now met by a new, useful, and non-obvious invention. The invention meets the need for a new accessible pill container that overcomes the issues inherent in the prior art.

The present invention relates generally to an accessible pill container comprising a plurality of closely positioned blades that are integrally formed and molded within a plastic container and forming a concave bowl-shaped platform at a proximal end to be able to hold at least one pill created by the close proximity and concave shape of the blades. Pills enter the bowl by tilting the pill container sideways or upside down so that all of the pill contents rush toward the top of the bottle. Enough space is left between the bowl-shaped platform top and the underside of the secured pill bottle cover cap to allow one or two pills to enter the small open space and fall into the platform bowl capturing the pill or pills until the user tilts the bottle back to its upright vertical position, removes the cap and slides the pill or pills off of the capture bowl with thumb and forefinger to be placed inside the mouth.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings. The components of the drawings are not necessarily to scale, emphasis instead being placed upon clearly illustrating the principles of the present disclosure.

DETAILED DESCRIPTION OF THE DRAWINGS

The following description is of the best mode presently contemplated for carrying out the invention. This description is not to be taken in a limiting sense but is made merely for the purpose of describing one or more preferred embodiments of the invention. The scope of the invention should be determined with reference to the claims.

Figure 1:
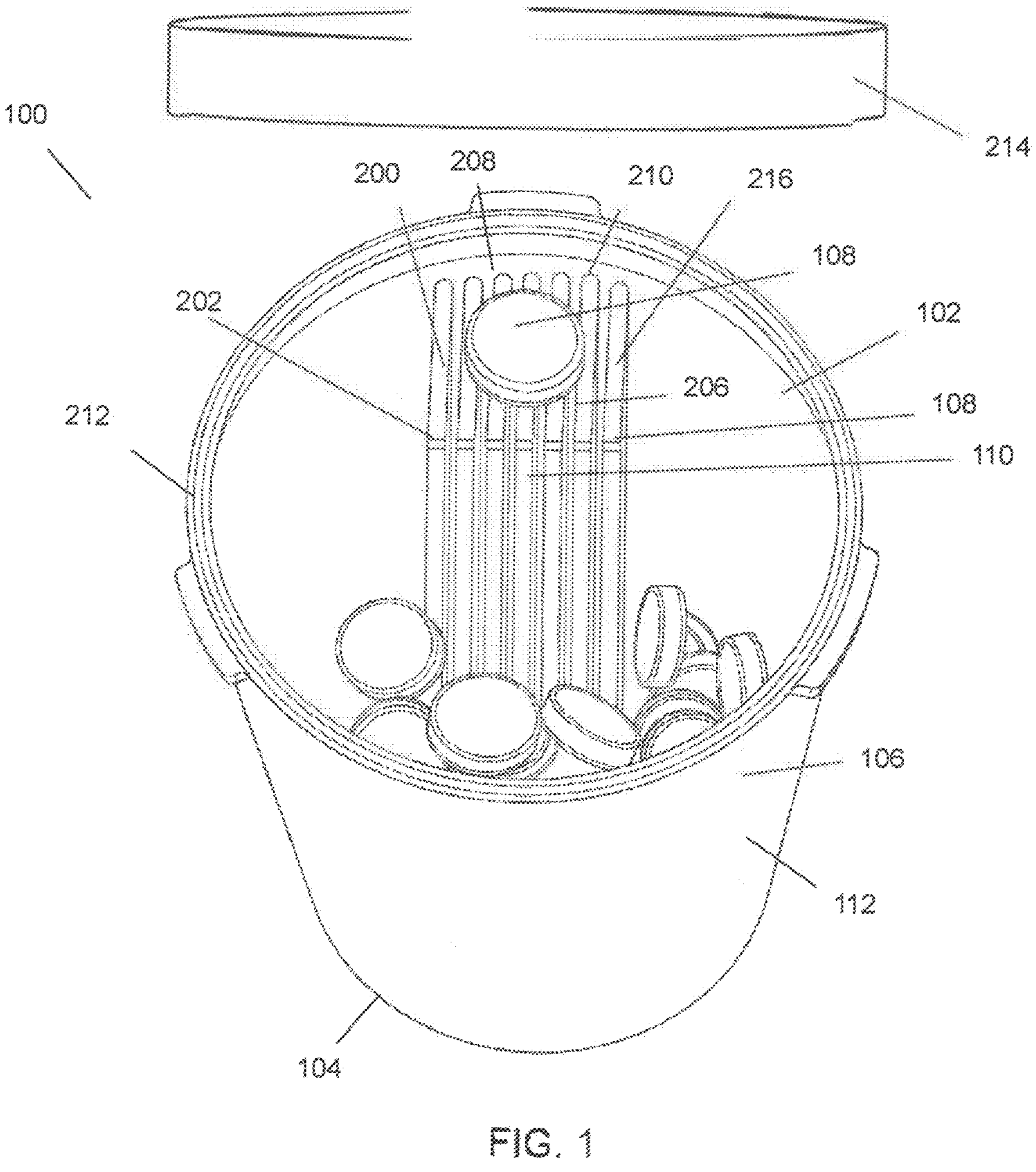
FIG. 1 is a perspective view of the present invention.

A first embodiment of the present invention is seen in FIG. 1, a container 100 has a proximal end 102, a distal end 104, and an outer wall 106. Preferably container 100 is made of a high-density polyethylene (HDPE), high density polypropylene (HDPP), polyethylene terephthalate (PET), or other similar thermoplastics that allow for precision molding or recycling. Preferably container 100 is cylindrical but may be any shape that is conducive to the delivery of pills using the system described herein. Integrally molded with the container 100 are a plurality of vertically oriented blades 200 projecting inward towards the container center 110. Each blade 200 is preferably spaced less than 0.25 inches from the next blade 200. Each blade 200 has a blade distal end 202 and a blade proximal end 204. Each blade 200 is preferably less than 0.25 inches thick and about one inch in depth. Preferably there are between three and ten blades 200. Each blade proximal end 204 has a concave horizontal top surface 216 such that each blade proximal end 204, when fully molded, forms a platform 206 in the shape of a concave bowl that has a surface area of no more than one square inch. At least three blades 200 are needed to form the platform 206. The curvature of each blade proximal end 204 is the same concave shape but a different height so that when positioned next to each other they create a bowl shape to capture the pill and hold it until being retrieved. Each blade 200 has a length that runs from the distal end 104 of container 100 towards the proximal end 102 up to a minimum of 75% of the height of the container 100 so that at least one pill 108 can be deposited at the platform 206 without falling out while at the same time preventing too many pills from being deposited.

Figure 2:
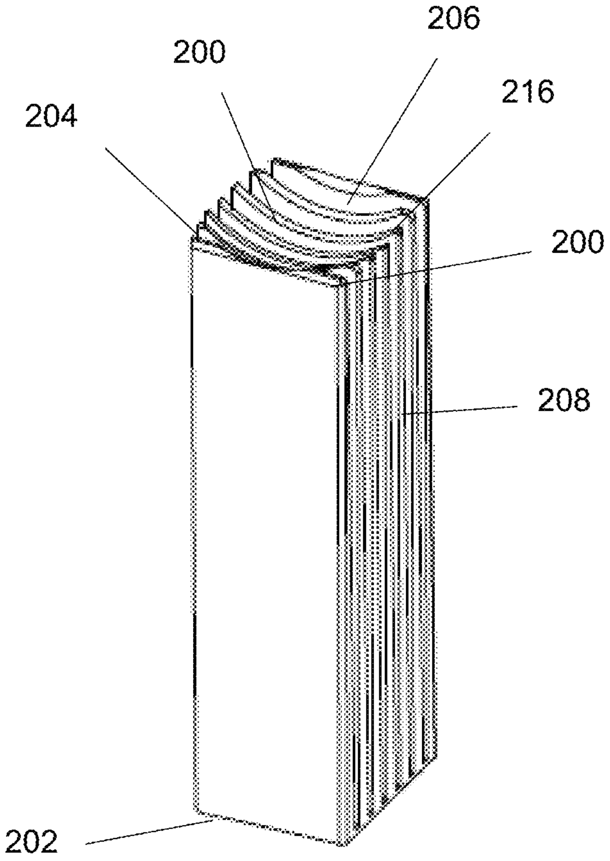
FIG. 2 is a perspective view of the platform of the present invention.
Figure 3:
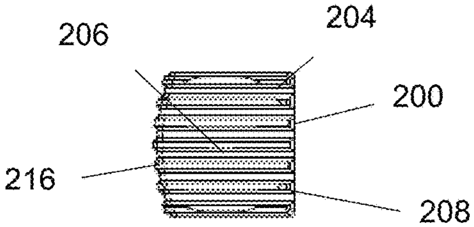
FIG. 3 is a top perspective view of the platform of the present invention.
Figure 4:
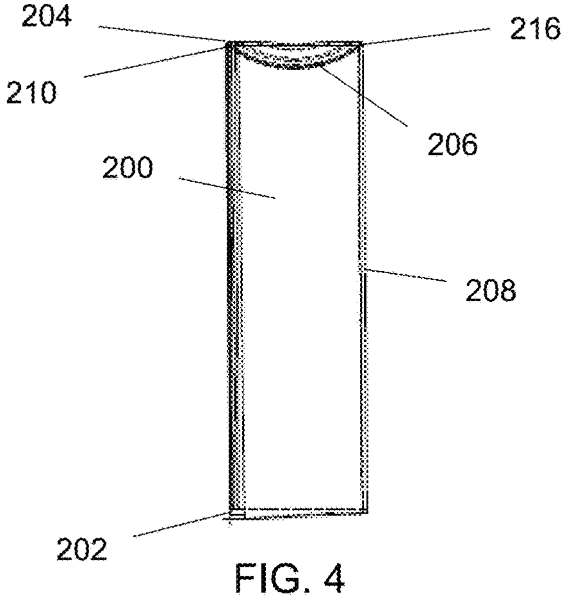
FIG. 4 is a side cross-sectional view of the platform of the present invention.

Further details about the blades 200 are shown in FIGS. 2 through 4. Preferably, the platform 206 is rounded or bowl-shaped but can be any shape that allows for retention of a pill 108. The depth of the platform 206 is dependent on the thickness of the pill 108. Each blade 200 has a back edge 208 that is integrally formed with the outer wall 106.

Figure 5:
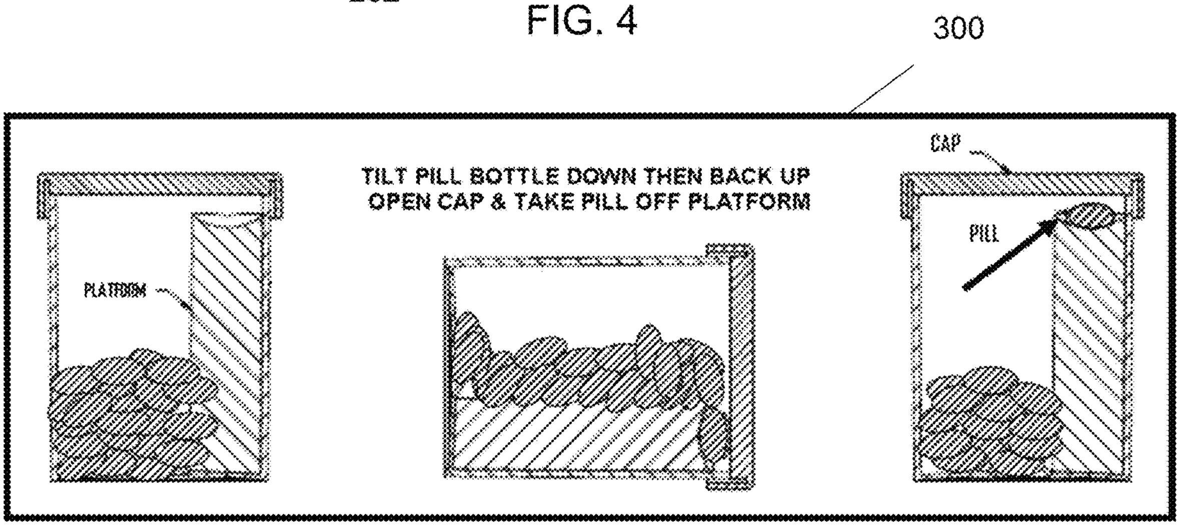
FIG. 5 is a cross-sectional view.

With reference to FIG. 5, the preferable method of getting a pill 108 onto platform 206 is to invert the container 100 sideways or upside down and then revert container 100 back to the original upright position. Alternatively, a user could shake the container 100 and the result should be at least one pill 108 deposited on the platform 206. The platform void 208 is the distance between the upper platform edge 210 and the bottom of cap 214 (when secured with container 100 using means for pill bottle cap securing known in the art) which should allow one or two pills 108 to be deposited onto the platform 206. At most, two pills 108 should be able to fit on the platform 206. As seen in FIG. 5, these instructions 300 are preferably imprinted onto the container exterior 112 of the outer wall 106 of container 100 whether by etching, raised integrally molded images, or other methods known in the art.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described.

What is claimed is:

1. An accessible pill container system comprising:

a cap;

a container with an open proximal end having a container ridge for engaging the cap, a closed distal end, and an outer wall; and a platform further comprising a plurality of vertically oriented blades, with each blade having a blade proximal end, a blade distal end, and a blade back edge, and wherein each blade distal end is integrally molded to the closed distal end, each blade back edge is integrally molded to the outer wall, and each blade proximal end has a concave edge which forms a bowl when at least three blades are present that leaves room for at least one pill between the platform and the cap when the cap is secured with the container.

2. The accessible pill container system of claim 1 the platform comprises between three blades and ten blades.

3. The accessible pill container system of claim 1 wherein the pill container system is molded from a thermoplastic material.

4. The accessible pill container system of claim 3 wherein the thermoplastic material is a copolymer material selected from the group consisting of high-density polyethylene, high-density polypropylene, and polyethylene terephthalate.

5. The accessible pill container system of claim 1 wherein the platform can hold more than one pill.

6. The accessible pill container system of claim 1 wherein the platform has a surface area of about one square inch.

7. The accessible pill container system of claim 1 wherein each blade has a height greater than 75% of an overall container height.

8. An accessible pill container system comprising:

a cap;

a container comprising a moldable thermoplastic material with an open proximal end having a container ridge for engaging the cap, a closed distal end, and an outer wall; and a platform having a surface area of at most one square inch further comprising a plurality of vertically oriented blades that have a total height greater than 75% of an overall container height, with each blade having a blade proximal end, a blade distal end, and a blade back edge, and wherein each blade distal end is integrally molded to the closed distal end, each blade back edge is integrally molded to the outer wall, and each blade proximal end has a concave edge which forms a bowl when at least three blades are present that leaves room for at least one pill between the platform and the cap when the cap is engaged with the container.

9. The accessible pill container system of claim 8 wherein the moldable thermoplastic material is a copolymer material selected from the group consisting of high-density polyethylene, high-density polypropylene, and polyethylene terephthalate.

10. The accessible pill container system of claim 8 further comprising permanent operating instructions on use of the accessible pill container system imprinted onto an exterior of the outer wall.

* * * * *